United States Patent
Halverson et al.

[11] Patent Number: 5,987,398
[45] Date of Patent: Nov. 16, 1999

[54] METHOD AND APPARATUS FOR STATISTICAL PROCESS CONTROL OF MACHINES AND PROCESSES HAVING NON-CONSTANT MEAN OF A RESPONSE VARIABLE

[75] Inventors: Galen Dean Halverson; Youn-Min Chou, both of San Antonio, Tex.

[73] Assignees: Sony Corporation, Tokyo, Japan; Sony Electronics, Inc., Park Ridge, N.J.

[21] Appl. No.: 09/069,868

[22] Filed: Apr. 30, 1998

[51] Int. Cl.⁶ .................................................. G06F 17/00
[52] U.S. Cl. .......................... 702/179; 702/81; 702/182; 364/148.6
[58] Field of Search ................................ 702/81, 84, 179, 702/182–183; 364/148.01, 148.06, 151–152, 164, 184; 706/23, 903, 906

[56] References Cited

U.S. PATENT DOCUMENTS

| | | | |
|---|---|---|---|
| 5,023,045 | 6/1991 | Watanabe et al. | 364/148.06 |
| 5,134,574 | 7/1992 | Beaverstock et al. | 702/84 |
| 5,196,997 | 3/1993 | Kurtzberg et al. | 364/468.16 |
| 5,257,206 | 10/1993 | Hanson | 364/148.06 |
| 5,311,759 | 5/1994 | Mangrulkar et al. | 702/183 |
| 5,339,257 | 8/1994 | Layden et al. | 702/84 |
| 5,402,367 | 3/1995 | Sullivan et al. | 702/85 |
| 5,408,405 | 4/1995 | Mozumder et al. | 364/468.28 |
| 5,440,478 | 8/1995 | Fisher et al. | 702/179 |
| 5,442,562 | 8/1995 | Hopkins et al. | 364/148.01 |
| 5,539,752 | 7/1996 | Berezin et al. | 364/490 |
| 5,715,181 | 2/1998 | Horst | 702/182 |

Primary Examiner—John Barlow
Assistant Examiner—Bryan Bui
Attorney, Agent, or Firm—Ronald P. Kananen; Rader, Fishman & Grauer

[57] ABSTRACT

A method and apparatus for analyzing a process or machine having a non-constant mean of a response variable using statistical process control techniques. Several measurements of a response variable are taken while the monitored machine is known to be operating in control. Through statistical regression techniques, a mathematical formula is derived to predict the value using indicator variables at various periods in the process. Then, while the process or machine is operating on an ongoing basis, actual measurements of the response variable are taken and compared to the predicted values using indicator variables calculated from the derived formula. Statistical process control rules are applied to the measured values of the response variable and the predicted value using indicator variables to determine if the machine or process has fallen out of control.

15 Claims, 7 Drawing Sheets

FIG. 5

| THICKNESS | GROUP NO. | ACCUMULATED HOURS | NUMBER OF WAFERS | ROW |
|---|---|---|---|---|
| 7202.83 | 1 | 8.17 | 1 | 1 |
| 7176.06 | 1 | 16.33 | 2 | 2 |
| 7087.80 | 1 | 1543.50 | 189 | 3 |
| 7085.29 | 1 | 1649.67 | 202 | 4 |
| 7033.51 | 1 | 2466.33 | 302 | 5 |
| 7001.08 | 1 | 2833.83 | 347 | 6 |
| 6990.15 | 1 | 2956.33 | 362 | 7 |
| 6966.92 | 1 | 3470.83 | 425 | 8 |
| 6952.79 | 1 | 4173.17 | 511 | 9 |
| 6918.23 | 1 | 4712.17 | 577 | 10 |
| 6879.86 | 1 | 5430.83 | 665 | 11 |
| 6868.00 | 1 | 5700.33 | 698 | 12 |
| 7193.91 | 2 | 8.17 | 1 | 13 |
| 7192.22 | 2 | 16.33 | 2 | 14 |
| 7175.56 | 2 | 302.17 | 37 | 15 |
| 7171.83 | 2 | 383.83 | 47 | 16 |
| 7144.22 | 2 | 710.50 | 87 | 17 |
| 7133.40 | 2 | 873.83 | 107 | 18 |
| 7108.99 | 2 | 1094.33 | 134 | 19 |
| 7106.17 | 2 | 1339.33 | 164 | 20 |
| 7095.09 | 2 | 1372.00 | 168 | 21 |
| 7078.99 | 2 | 1649.67 | 202 | 22 |
| 7032.46 | 2 | 2409.17 | 295 | 23 |
| 7007.23 | 2 | 2613.33 | 320 | 24 |
| 7005.87 | 2 | 3029.83 | 371 | 25 |
| 6969.22 | 2 | 3470.83 | 425 | 26 |
| 6960.71 | 2 | 3781.17 | 463 | 27 |
| 6958.99 | 2 | 3830.17 | 469 | 28 |
| 6895.32 | 2 | 5096.00 | 624 | 29 |
| 6891.10 | 2 | 5185.83 | 635 | 30 |
| 6878.06 | 2 | 5496.17 | 673 | 31 |
| 7199.29 | 3 | 8.17 | 1 | 32 |
| 7194.90 | 3 | 40.83 | 5 | 33 |
| 7170.72 | 3 | 392.00 | 48 | 34 |
| 7168.07 | 3 | 490.00 | 60 | 35 |
| ... | ... | ... | ... | ... |
| 7177.68 | 14 | 8.17 | 1 | 140 |
| 7179.67 | 14 | 40.83 | 5 | 141 |
| 7150.02 | 14 | 514.50 | 63 | 142 |
| 7133.09 | 14 | 743.17 | 91 | 143 |
| 7061.00 | 14 | 1625.17 | 199 | 144 |
| 7010.56 | 14 | 2703.17 | 331 | 145 |
| 6949.44 | 14 | 3585.17 | 439 | 146 |
| 6917.43 | 14 | 4467.17 | 547 | 147 |
| 6882.46 | 14 | 5071.50 | 621 | 148 |

METHOD AND APPARATUS FOR STATISTICAL PROCESS CONTROL OF MACHINES AND PROCESSES HAVING NON-CONSTANT MEAN OF A RESPONSE VARIABLE

FIELD OF THE INVENTION

This invention relates to the use of statistical process control methods for processes that have non-constant expected values that can be characterized through use of indicator variables, and more particularly to an apparatus and method for implementing statistical process control methods in connection with processes and machines used in the semiconductor manufacturing industry that have non-constant expected values of response variables.

BACKGROUND OF THE INVENTION

Statistical Process Control ("SPC") methods generally are well-known statistical tools for helping manufacturers monitor and analyze measurements of response variables observed from their machines or processes to make sure that the machines or processes are operating properly and to identify when they are not operating properly. Machines and processes that are operating properly are said to be operating "in control" and machines and processes not operating properly are said to be operating "out of control." SPC methods are typically built around the idea that measurements of response variables taken from a process or machine can be described as approximately statistically "normal". When these "normal" data are plotted in the order in which they are observed originating from the process, the data form a kind of cloud that is most dense near the center or average with gradual thinning out as the values increasingly differ from the average. FIG. 1 shows a plot of a sample set of data points which is approximately "normal" with an average value or centerline 6.

The graph shown in FIG. 2, a "normal" curve, demonstrates the relationship between the observed data points shown in FIG. 1 and the frequency of their occurrence. FIG. 2 demonstrates that the data value with the highest frequency 8 corresponds to the average value 6 in FIG. 1.

As an example of normal data collected from a process or machine, consider a machine designed for cutting strips of plastic at a pre-set length of 6 inches from a continuous role of plastic. In this case, one response variable might be the length of each plastic strip. While the expected average length of each cut plastic strip is 6 inches, it is not unusual that each plastic strip will not be exactly 6 inches long. That is, the machine is still considered to be operating properly if, within a sample of a particular number of plastic strips produced by the machine, there is a variance in the lengths of the individual plastic strips, provided however, that as the variance between the actual length of the plastic strips and the expected length (6 inches) increases, the frequency of such occurrences decreases. In other words, if the lengths of all of the sample plastic strips were plotted as in FIG. 1, most of the values would hover slightly above or slightly below 6 inches with some values straying further away from 6 inches, but with less frequency. SPC methods depend upon measurements of response variables observed from a process or machine conforming to a "normal" probability distribution.

SPC analysis begins by calculating the average value of a response variable and the associated standard deviation while the machine or process is known to be operating in control. Then, when the machine or process is operating on an ongoing basis, observed measurements of the response variable are compared to the known average and standard deviation.

Various simple well-known SPC rules have been developed to assist operators to determine if their machines or processes are no longer operating properly, or have fallen "out of control." The rules are designed to look for patterns in the response variables observed from the machine or process. The decision criteria to determine if the machine or process is out of control are typically set so that a pattern would rarely happen by chance alone under the assumed condition that the data are "normal" and centered on some constant average value. For example, an operator applying one particular SPC rule would check to see if at least 4 out of 5 consecutive observed values of a particular response variable are on the same side of the calculated centerline, i.e., the response variable's calculated average value under normal operating conditions, and are outside of the upper or lower control limit (set at 1 standard deviation above and below the average for purposes of this SPC rule). Under ideal operating conditions, these two conditions in the rule would only be satisfied simultaneously about once in every 360 data values. Because the pattern almost never happens by chance alone, the operator can be reasonably confident that the occurrence of this pattern means that the assumed condition, that is that the machine or process is still in control and the actual mean value of the observed data is the same as the calculated average value, is no longer valid. For instance, in the previously-described example regarding the processing of plastic strips, if the operator of the machine were to observe the 4 out of 5 rule being violated, he could conclude that the machine for some reason was no longer operating in control, and that the actual mean length of the strips being produced was no longer 6 inches. Accordingly, the violation of the 4 out of 5 rule would suggest that investigation is needed and that actions may be needed to restore the machine or process to its steady state control condition. There are many well-known SPC rules, but most depend upon comparing observed response variable measurements to known calculated response variable averages and upper and lower control limits, which are generally derived from standard deviation calculations.

SPC rules, like the 4 out of 5 rule described above, are very simple to use. Indeed, busy operators can use simple SPC rules to make quick decisions about the need for action when they use SPC charts to monitor processes or when computers or central processors analyze the data automatically. The SPC rules are theoretically applicable to virtually any process or machine that has a response variable with a constant mean or average value that can be measured and monitored. But in semiconductor manufacturing, the simple SPC rules are not easily applicable and have not been used effectively in the industry for many processes because many of the variables of processes in the semiconductor manufacturing industry do not have a constant expected value. Instead, many of the measurements of such processes are expected to have a varying mean value as the machine or process is used. Traditional applications of SPC rules are not equipped to account for varying mean values, and are therefore ineffective as applied to such machines or processes.

For example, a semiconductor manufacturer may use atmospheric pressure chemical vapor deposition ("CVD") equipment to make a glass film. As the equipment runs, the exhaust deposits on equipment parts changing the pressure which in turn changes the thickness of the glass deposition on the wafer. With that CVD equipment, users expect the process and therefore the value of response variables to change over the period of use.

Another example is the use of an etcher that has a manually adjusted electrode. As the equipment is used, the electrode wears out. As the electrode wears out, the gap changes and the wafer is affected. Again, in such a process, the operator expects that the mean value of response variables observed from the wafer will change over the period of the process. Thus, traditional application of SPC rules which depend upon a constant mean value would be ineffective to monitor the process.

Finally, a third example of semiconductor manufacturing processes that have expected varying mean response variables is found in the sputtering process, wherein a layer of aluminum is deposited on the surface of a semiconductor wafer. The aluminum is deposited on the wafer by eroding it off of an aluminum source target. As machine hours of the sputtering equipment are accumulated, the aluminum thickness deposited in a fixed amount of sputtering time will change because there is less aluminum on the source target. Sequential wafers are expected to receive less aluminum unless the sputtering time is increased. Therefore, if sputtering time is set as a constant, the sputtering process is expected to have a pattern of continually-reduced aluminum thickness both on the source target and the wafers as more wafers are processed. Typically, to maintain a minimum level of aluminum being deposited on the wafers, the level of aluminum on the target source is readjusted periodically. As a result, the process centerline or mean thickness of aluminum deposited on the wafer is expected to vary as the aluminum on the target source diminishes and as it is replenished periodically. Accordingly, the mean value of the aluminum thickness on the wafer is not expected to be a constant, and traditional application of SPC rules to monitor and analyze the thickness level of aluminum in a sputtering process is not effective.

Accordingly, a method, and apparatus for implementing that method, for applying SPC rules to monitor and analyze semiconductor manufacturing processes is desirable.

SUMMARY OF THE INVENTION

The disclosed invention addresses the application of SPC rules to machines and processes, particularly in the area of semiconductor manufacturing, wherein the mean value of the response variable is expected to vary over the period of the process and with scheduled abrupt readjustments of the machine or process. The purpose of the disclosed invention is to provide a method and apparatus which will permit the application of well-known SPC rules to such machines and processes. Because traditional application of SPC rules depends upon the monitored machine or process having a response variable with a constant mean value, and because it is normal and expected for the mean values of response variables measured from many semiconductor manufacturing processes to vary, the disclosed invention provides a method and apparatus for predicting mean values at various times during the process and thereafter applying SPC rules to monitor and analyze semiconductor manufacturing processes.

The method consists generally of implementing statistical regression analysis techniques, including the concept of indicator variables as input conditions, to determine a mathematical relationship which can be used to predict the expected mean of the response variable of the machine or process at any specified time during the process or operation of the machine. Once such a mathematical relationship is derived based on data accumulated while the machine or process is known to be operating properly, a profile for expected values of the response variable, and the associated standard deviations, can be plotted and analyzed in connection with actual measured values from the process or machine as it is operating on an ongoing basis. Well-known SPC rules, such as the 4 out of 5 rule described above, can be applied to actual response measurements using expected values based upon indicator variables at specified times during the process or operation of the machine to determine if the machine or process is in control.

The above, and other objects, features and advantages of the present invention will be apparent from the following detailed description thereof which is to be read in connection with the accompanying drawings.

BRIEF DESCRIPTION OF THE DRAWINGS

FIG. 5 is a table of sample data observed from a sputtering machine, including the thickness of the aluminum deposited on processed wafers, the accumulated hours of the sputtering process since the last target source thickness readjustment, and the number of wafers produced since the last target source thickness readjustment.

DETAILED DESCRIPTION OF THE INVENTION

For simplicity, the disclosed invention will be described in detail as it is used in connection with a sputtering process in semiconductor manufacturing. But it should be noted that the disclosed invention can be used in any situation wherein the mean of the response variable of the process or machine being monitored is expected to change over the course of the process.

Figure 1:
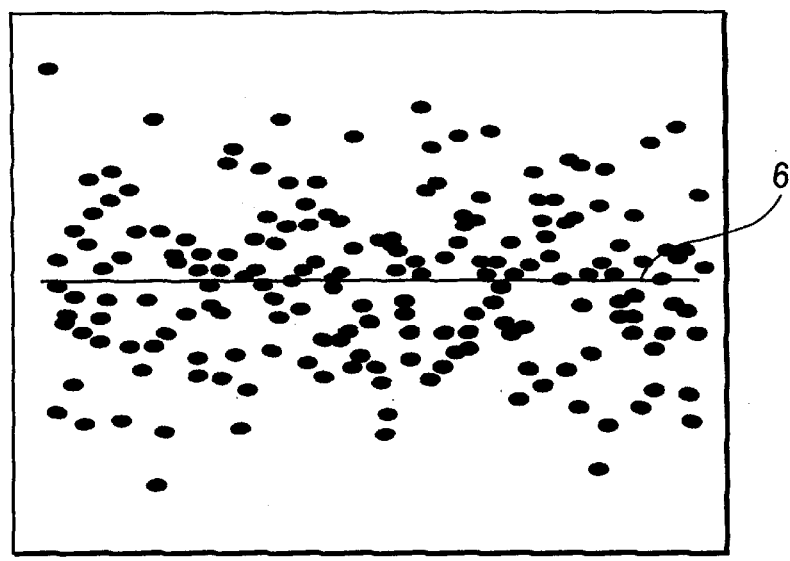
FIG. 1 is an illustrative plot of sample data points that form an approximately "normal" configuration.
Figure 2:
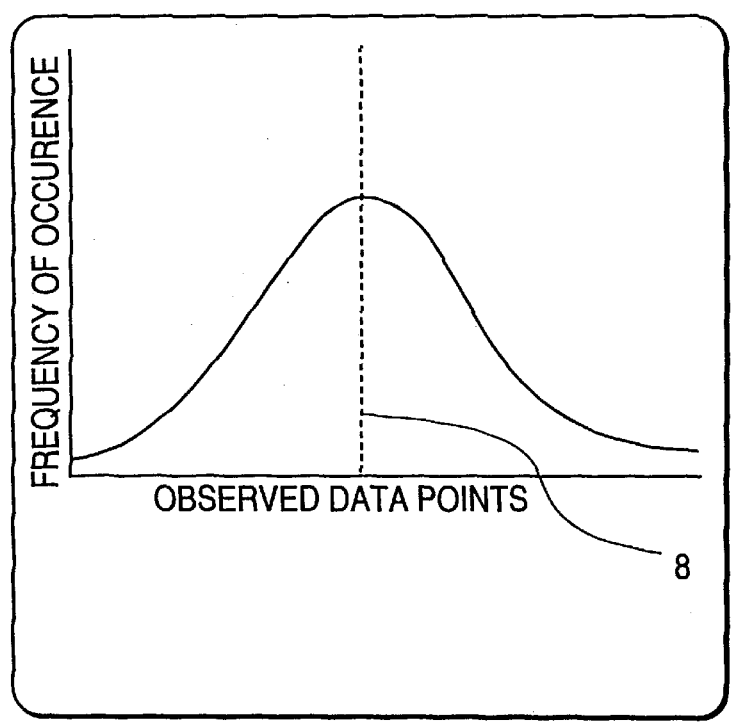
FIG. 2 is an illustrative standard "normal" curve which demonstrates the relationship between the observed data points shown in FIG. 1 and the frequency of their occurrence.
Figure 3:
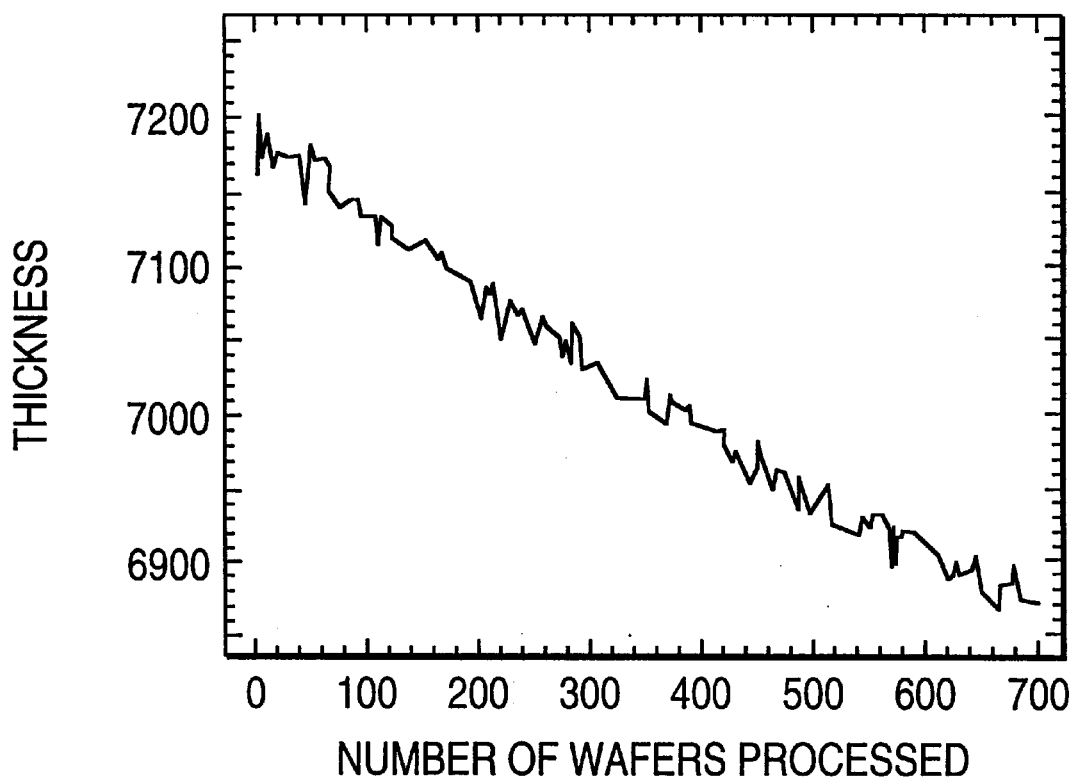
FIG. 3 is a graph that shows sample observed aluminum thickness levels of processed wafers decreasing over the course of the sputtering process.
Figure 4:
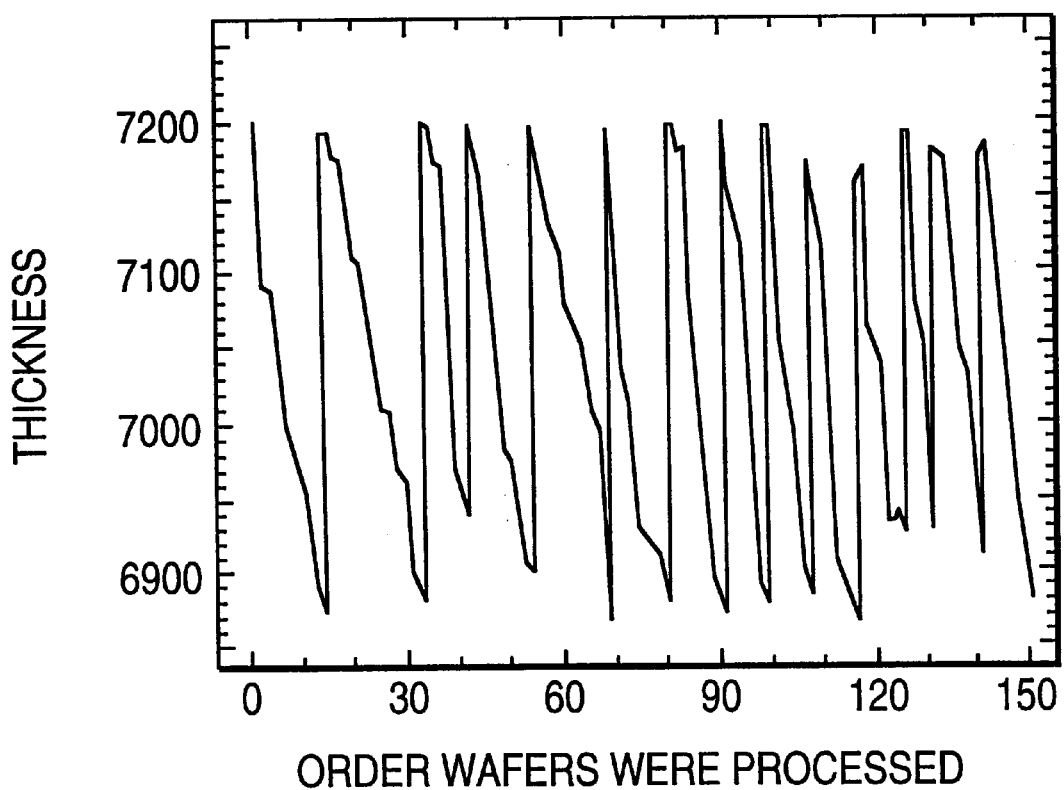
FIG. 4 is a graph that illustrates the decreasing thickness of the aluminum sputtered on processed wafers over the course of the sputtering process and the repetition of that pattern after each time the aluminum source target is readjusted to replenish the aluminum source.

In semiconductor manufacturing, metal is used to interconnect the components within an integrated circuit. A layer of metal, usually aluminum, is deposited on the entire top surface of the wafer through a process known as sputtering. In a sputtering process, a source target of aluminum is bombarded with excited ions that knock aluminum from the source target and deposit it on a wafer for an amount of time ranging from 30 to 45 seconds. Industry uses 5000 to 9000 angstroms as the desired thickness for deposition of aluminum of a wafer. The aluminum source target wears out over time and will effectively be consumed in about a month of process time, or equivalently, 1200 KW hours. To maintain the deposited aluminum thickness at, for example, 7000 angstroms, a readjustment of the aluminum level on the target source must be made every 650 to 750 wafers, or about every 80 to 90 KW hours. Accordingly, an adjustment in the aluminum level on the target source to raise it back to its approximate starting point is made approximately every 2 to 2.25 days, totaling about 13 to 15 adjustments per month. FIG. 3 is a graph that shows sample aluminum thickness levels deposited on a wafer decreasing over the course of the sputtering process. FIG. 4 is a graph that illustrates the decreasing thickness of the aluminum deposited on a wafer over time and the repetition of that pattern after each time the aluminum source target is readjusted to replenish its aluminum level.

Figure 6:
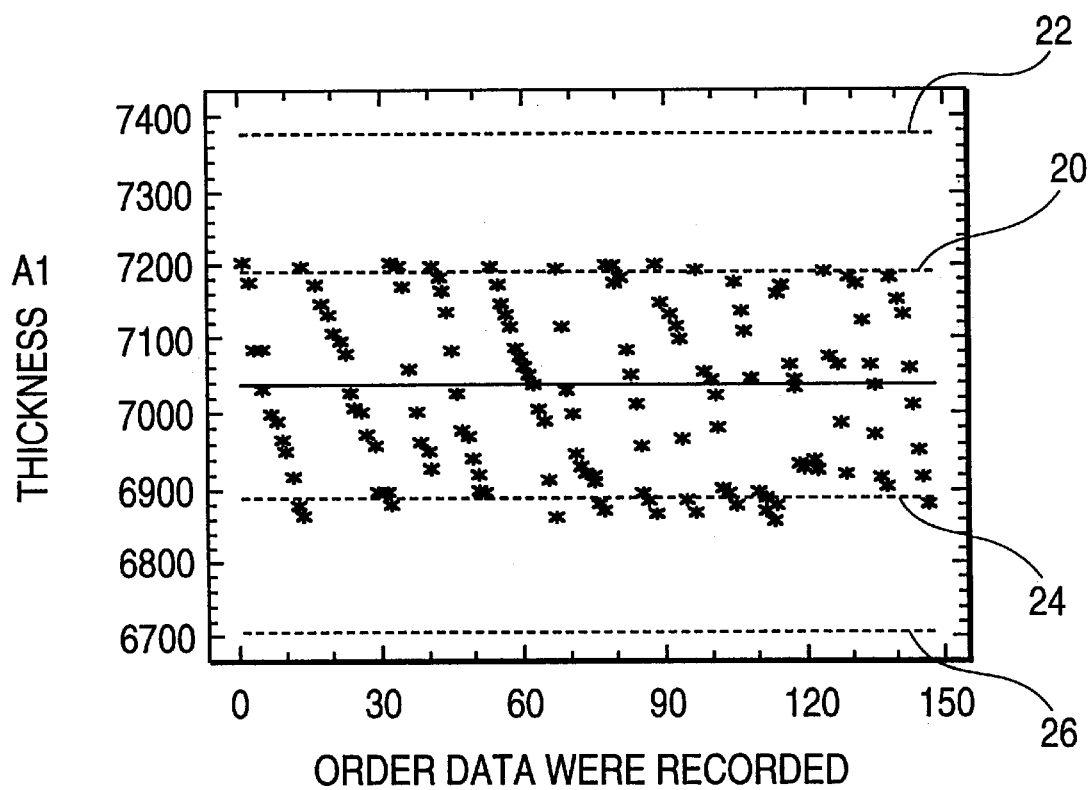
FIG. 6 shows a traditional Shewhart control chart of the aluminum thickness measurements detailed in FIG. 5.

One observable response variable in a sputtering process that can be used to monitor the process and determine if the machine is operating in control is the thickness of the aluminum deposited on processed wafers. But since the thickness of the aluminum deposited on sequentially-processed wafers is expected to change over the course of the sputtering process, as illustrated in FIG. 4, traditional application of SPC rules, such as the 4 out of 5 rule described above, would be ineffective to analyze whether a sputtering machine is in control. For example, a table of sample data observed from a sputtering machine is shown in FIG. 5. Column 1 gives the measured thickness of the aluminum deposited on processed wafers, and column 2 shows the group number from which the associated measurements were taken. That is, group 2 measurements were taken after the first readjustment of the aluminum level on the target source. Column 3 shows the accumulated hours of the process in connection with the associated group of data, and column 4 gives the number of wafers processed at the time of the measurement. FIG. 6 shows a traditional Shewhart control chart of the aluminum thickness levels detailed in FIG. 5. The centerline 10 represents the mean thickness level for all aluminum deposits over the course of the process without regard to any observable patterns in the data. FIG. 6 also shows two possible sets of control limits, each having an upper control limit 20, 22 and a lower control limit 24, 26. The upper control limit 20 and lower control limit 24 constitute a pair and are derived by setting them at the limits of the range of the observed data. The upper control limit 22 and lower control limit 26 also constitute a pair and they are derived by setting them three standard deviations from the mean. As can be seen from FIG. 6, the control limit pair 20, 24 derived from the limits of the data range is too tight, resulting in traditional application of many SPC rules giving false alarms that the process is out of control. On the other hand, the upper control limit pair 22, 26 derived from the standard deviation of the observed data is too wide, resulting in the possibility that the process could be getting out of control without being detected by traditional SPC rules.

However, the disclosed invention demonstrates that traditional SPC rules can be used to monitor the sputtering process if the expected mean aluminum thickness can be determined for each cumulative number of wafers produced. If a mathematical relationship can be developed that predicts the expected thickness of aluminum deposited on a wafer, given the number of wafers processed, then it is possible to monitor and analyze the aluminum thickness using SPC rules by comparing expected mean thickness values to corresponding measured thickness values for the same number of wafers produced. The SPC analysis disclosed by this invention is in contrast to a traditional SPC analysis wherein observed thickness values would be compared to a single process mean thickness value regardless of the number of wafers already processed and irrespective of any observable patterns in the data.

FIG. 3, a plot of the thickness of the aluminum deposited on processed wafers (Y) versus the number of processed wafers (W), shows that there is a systematic pattern in each group of thickness measurements in relationship to the number of wafers processed. This pattern can be fitted or predicted by a statistical regression equation that includes use of indicator variables to distinguish between adjustment periods. Since in the described example, there are 13 adjustments, or equivalently, 14 groups of data, 13 indicator variables $X_1, X_2, X_3, \ldots, X_{13}$ are defined as follows:

$X_k=1$ if the group number is k; $X_k=0$ otherwise, for $k=1,2,\ldots,13$.

To find the relationship between the thickness of the aluminum source target (Y) and the number of wafers processed (W), well-known statistical multiple regression techniques are applied. Depending upon the machine or process being observed and monitored, different multiple regression models may be appropriate. Through experimentation, it has been determined that a first order regression model does not fit the data observed from a sputtering process particularly well. However, as a result of the slight curvature in the plot of observed Y versus W values set forth in FIG. 3, it has been determined that a second-order regression model does fit the observed data. Therefore, the second-order regression model with indicator variables of the following form is applied:

$$Y=\beta_0+\beta_1 W+\beta_2 W^2+\alpha_1 X_1+\alpha_2 X_2+\ldots+\alpha_{13}X_{13}+\epsilon$$

where the $\beta$ and $\alpha$ are unknown constant coefficients, and $\epsilon$ is a random error variable. After well-known regression analysis techniques are employed to estimate the $\beta$ and $\alpha$ values, the regression model equation for the sample set of observed data shown in FIG. 5 is as follows:

$$\hat{Y} = 7179.86 - 0.585524W + 0.00018049W^2 + \qquad (1)$$
$$10.63X_1 + 11.645X_2 + 19.883X_3 + 6.663X_4 + 11.834X_5 +$$
$$7.717X_6 + 17.008X_7 + 12.272X_8 + 21.203X_9 -$$
$$8.636X_{10} - 5.606X_{11} + 13.789X_{12} + 7.953X_{13}$$

Using the fitted regression equation above in (1), it is possible to predict the thickness of the aluminum deposited on any particular wafer given the cumulative number of wafers processed. In the above-described example, the predicted thickness of the deposited aluminum as a function of the number of wafers processed is as follows:

$$\hat{Y} = 7179.86 - 0.585524W + 0.00018049W^2 + 10.63 \text{ for group1,}$$

$$\hat{Y} = 7179.86 - 0.585524W + 0.00018049W^2 + 11.645 \text{ for group2,}$$

$$\vdots$$

$$\hat{Y} = 7179.86 - 0.585524W + 0.00018049W^2 \text{ for group14.}$$

Once the mathematical relationship between the predicted mean aluminum thickness and the number of wafers processed is derived, an operator can use this relationship to predict the aluminum thickness for any wafer processed at any point in the process if the cumulative number of wafers processed is known. The operator can also set upper and lower control limits (derived from calculated standard deviations) around the mean thickness value at any point in the process and then apply traditional SPC rules to determine if the process or machine is operating in control.

Figure 8:
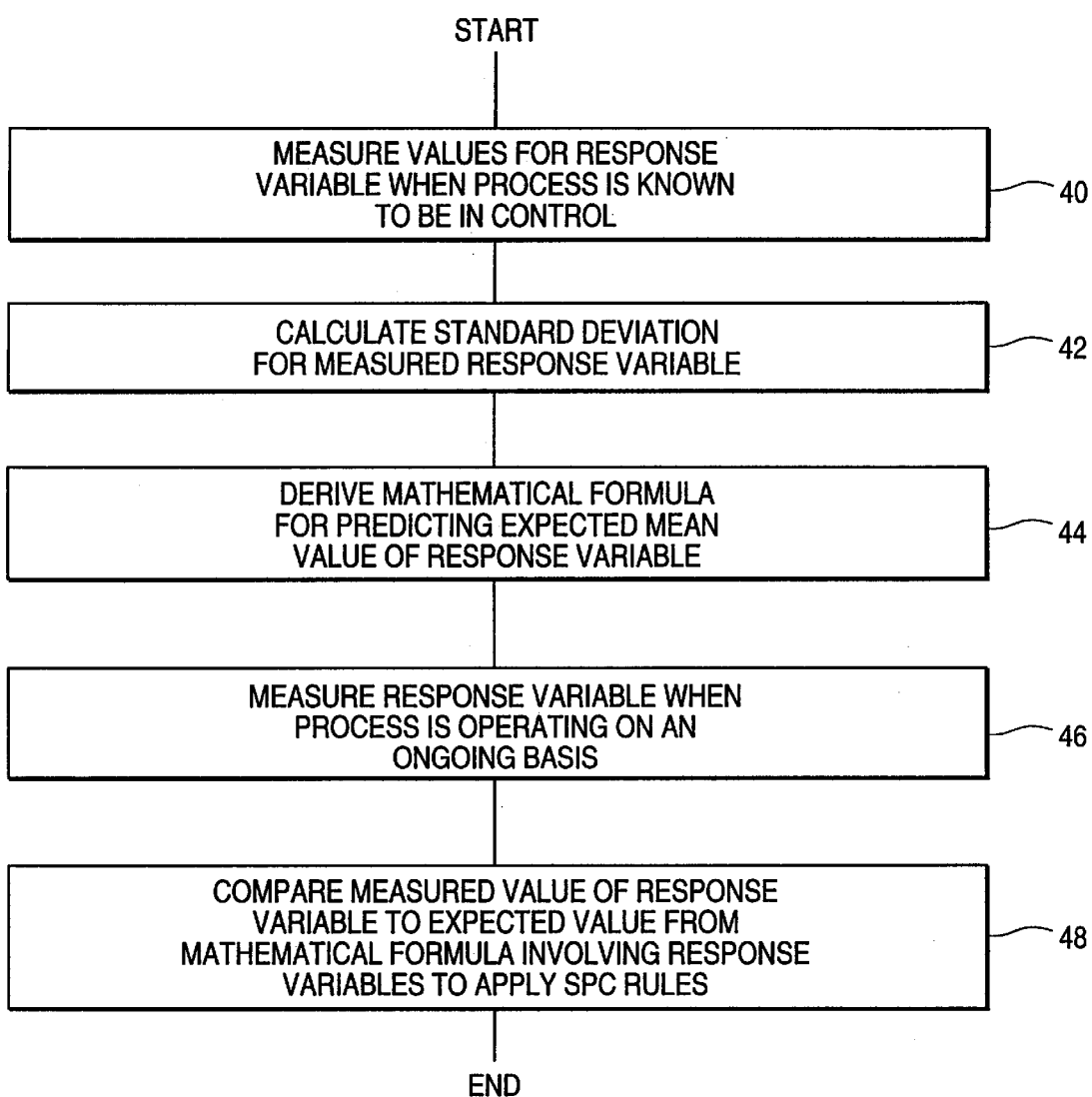
FIG. 8 is a flowchart which illustrates the steps constituting the process disclosed by this invention.

In operation, the above-described invention is implemented to monitor the operation of a sputtering machine by evaluating the thickness of the aluminum deposited on processed wafers as shown in FIG. 8. Step 40 shows that when the sputtering machine is thought to be operating in control, the aluminum thickness levels at various points throughout the process are measured and accumulated as in FIG. 5. The measuring and accumulation of the data while the machine is operating in control can be accomplished through various methods, including electronic sensing circuits. It is also advisable to measure the aluminum thickness level of each wafer that is processed in a specified position relative to each target source readjustment. For example, the thickness level for each wafer processed immediately after a target source readjustment could be measured so that, as shown in step 42, the standard deviation of observed thickness levels can be calculated. This standard deviation can be used later to establish upper and lower control limits, if desirable, for all points of observation throughout the process.

From the accumulation of observed data, statistical regression analysis using indicator variables is used as described above to determine a mathematical relationship between the predicted thickness level as a function of the number of wafers processed. This is shown in step 44. The regression analysis can be performed in various manners, including through the use of a computer or central processing unit to perform the necessary calculations. FIG. 4 shows a graphical representation of a mathematical relationship between the predicted thickness of aluminum deposited on wafers and the cumulative number of wafers processed.

After the mathematical relationship is determined based upon data observed when the machine is known to be operating in control, SPC rules are applied to data measured from the sputtering machine during ongoing operation to determine if the machine is operating in or out of control. During ongoing operation of the sputtering machine, the thickness of the aluminum deposited on wafers is measured for various wafers, as shown in step 46. These measurements may be made using electrical sensing circuits. Traditional SPC rules are then applied to the measured data by comparing the measured aluminum thickness to the predicted mean aluminum thickness calculated from the derived mathematical relationship. This is shown in step 48. The comparison and analysis may either be accomplished by a computer or central processing unit, or it may be accomplished graphically by a human operator manually examining a graph such as that shown in FIG. 7.

Figure 7:
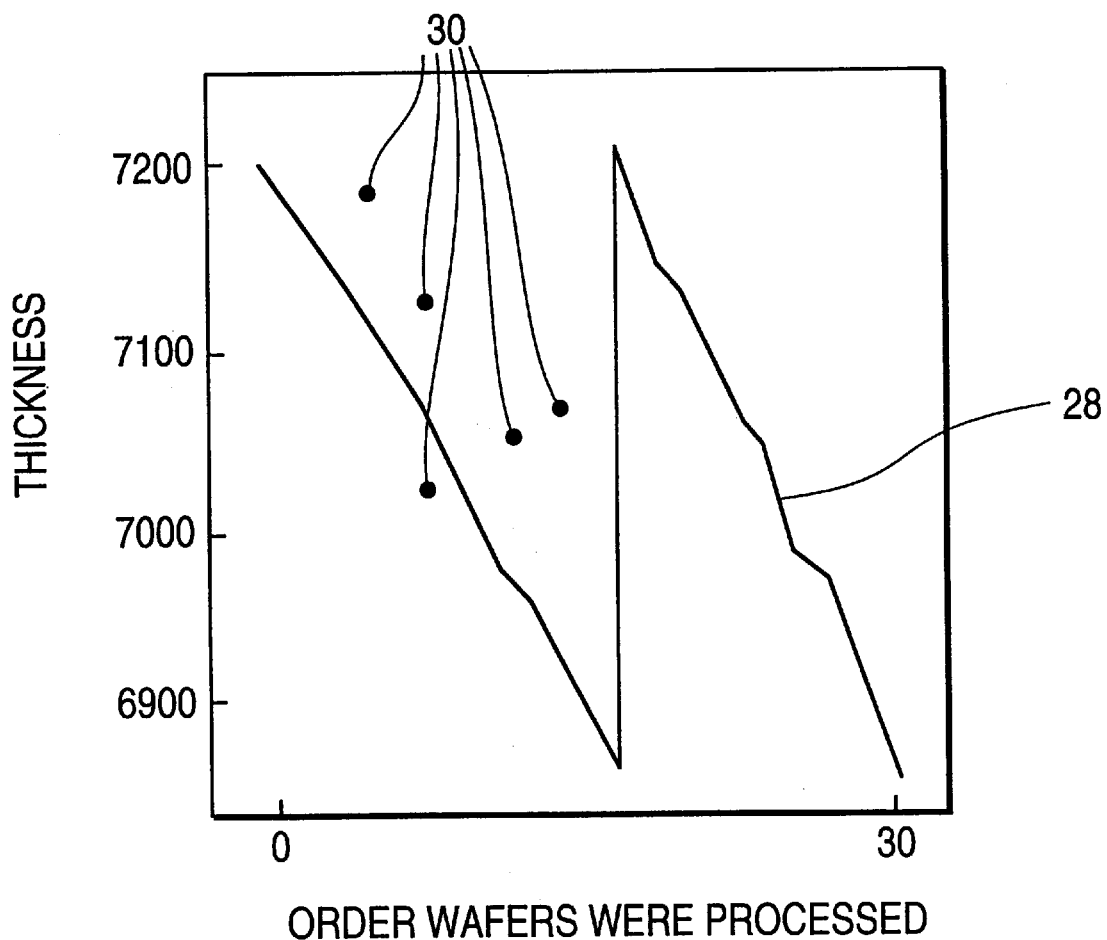
FIG. 7 is a graphical representation of the expected aluminum thickness measurements as a function of the number of wafers processed and it also shows observed thickness measurements from the sputtering process on an ongoing basis.

For example, FIG. 7 is a graph which depicts a sample mathematical relationship 28 between the thickness of the aluminum deposited on a wafer and the cumulative number of wafers processed. FIG. 7 also shows several individual data points 30 which represent illustrative sample data measured from a sputtering machine during ongoing operation. As can be seen, 4 out of the 5 measured data points 30 in FIG. 7 fall above the mean for that particular wafer. If those 4 observed values are at least one standard deviation from the corresponding mean, then the 4 out of 5 SPC rule would be violated, and the operator may consider the sputtering machine to be operating out of control. The operator would then investigate the machine or process to adjust the machine back into control. If the application of SPC rules is accomplished through a computer or central processing unit, the computer or central processing unit measures and accumulates the data, compares it to the expected values using traditional SPC rules, and alerts the machine operator if and when the machine falls out of control. Alternatively, the computer or central processing unit could be programmed to automatically adjust the machine back into control.

The preceding description is exemplary rather than limiting in nature. A preferred embodiment of this invention has been disclosed to enable one skilled in the art to practice this invention. Variations and modifications are possible without departing from the spirit and purview of this invention, the scope of which is limited only by the appended claims.

What is claimed is:

1. A method for analyzing a process or machine having a non-constant mean value of a response variable using statistical process control techniques comprising the steps of:

identifying an indicator variable which varies in correlation with said mean value of said response variable;

measuring said response variable while the process or machine is operating in control;

deriving a mathematical formula correlating said indicator variable to said mean value of said response variable for predicting said mean value based on a value of said indicator variable;

measuring actual values of said response variable during ongoing operation of the process or machine; and applying statistical process control rules by comparing said measured actual values to said predicted mean value of said response variable based on a current value of said indicator variable.

2. The method of claim 1 wherein said deriving step comprises utilizing statistical regression analysis to correlate said indicator variable and said non-constant mean value of said response variable.

3. The method of claim 1, further comprising the step of adjusting the process or machine if said application of statistical process control rules indicates that the process or machine has fallen out of control.

4. The method of claim 2, further comprising the step of adjusting the process or machine if said application of statistical process control rules indicates that the process or machine has fallen out of control.

5. An apparatus for analyzing a process or machine having a non-constant mean value for a response variable and an indicator variable which varies with said mean value of said response variable, the apparatus using statistical process control techniques and comprising:

circuitry for measuring said response variable while the process or machine is operating in control;

circuitry for correlating said indicator variable with said non-constant mean value of said response value for predicting an expected mean value of said response variable based on a current value of said indicator variable;

circuitry for measuring actual values of said response variable during ongoing operation of the process or machine; and circuitry for applying statistical process control rules by comparing said measured actual response values to an expected mean value of said response variable based upon said indicator variable.

6. The apparatus of claim 5, further comprising circuitry for adjusting the process or machine if said application of statistical process control rules indicates that the process or machine has fallen out of control.

7. A method for analyzing output of a process or machine having a non-constant mean value of a response variable, wherein an indicator variable varies in correlation to said mean value of said response variable, the method comprising comparing actual measured values of said response variable to an expected means value of said response variable calculated based on said indicator variable using said correlation between said indicator variable and said non-constant mean value of said response variable, wherein said actual values of said response variable are measured during on going operation of the process or machine.

8. The method of claim 7, wherein said comparing further comprises determining if said actual measured values of said response variable are within one standard deviation of said expected mean value of said response variable calculated based on said indicator variable.

9. The method of claim 8, wherein, if 4 of 5 of said actual measured values of said response variable equal or exceed on standard deviation of said expected mean value of said response variable calculated based on said indicator variable, said method includes the step of adjusting said process or machine.

10. The method of claim 8, wherein said process is the deposition of aluminum by sputtering on a semiconductor wafer, said response variable is the thickness of aluminum deposited on a wafer and said indicator variable is the number of wafers on which aluminum has been deposited using a single aluminum source target.

11. The method of claim 1, wherein said process is the deposition of aluminum by sputtering on a semiconductor wafer, said response variable is the thickness of aluminum deposited on a wafer and said indicator variable is the number of wafers on which aluminum has been deposited using a single aluminum source target.

12. An apparatus for analyzing a process or machine having a non-constant mean value for a response variable, said process or machine also having an indicator variable which varies in correlation with said mean value of said response variable, the apparatus comprising:

circuitry for measuring actual values of said response variable while the process or machine is operating;

circuitry for comparing said measured actual values of said response variable to an expected mean value of said response variable which is calculated based upon said correlation between said non-constant mean value of said response variable and said indicator variable.

13. The apparatus of claim 12, wherein said circuitry for comparing applies statistical process control rules to determine whether said apparatus is operating in control based on a coincidence of said measured actual values of said response variable and said expected mean value.

14. The apparatus of claim 13, wherein said circuitry for comparing determined whether said measured actual values of said response variable meet or exceed a standard deviation of said expected mean value.

15. The apparatus of claim 12, wherein said process is the deposition of aluminum by sputtering on a semiconductor wafer, said response variable is the thickness of aluminum deposited on a wafer and said indicator variable is the number of wafers on which aluminum has been deposited using a single aluminum source target.

* * * * *